Sept. 12, 1961     E. C. COLYER ET AL     2,999,577
EMBOSSING MACHINE
Filed Dec. 5, 1958     9 Sheets-Sheet 4
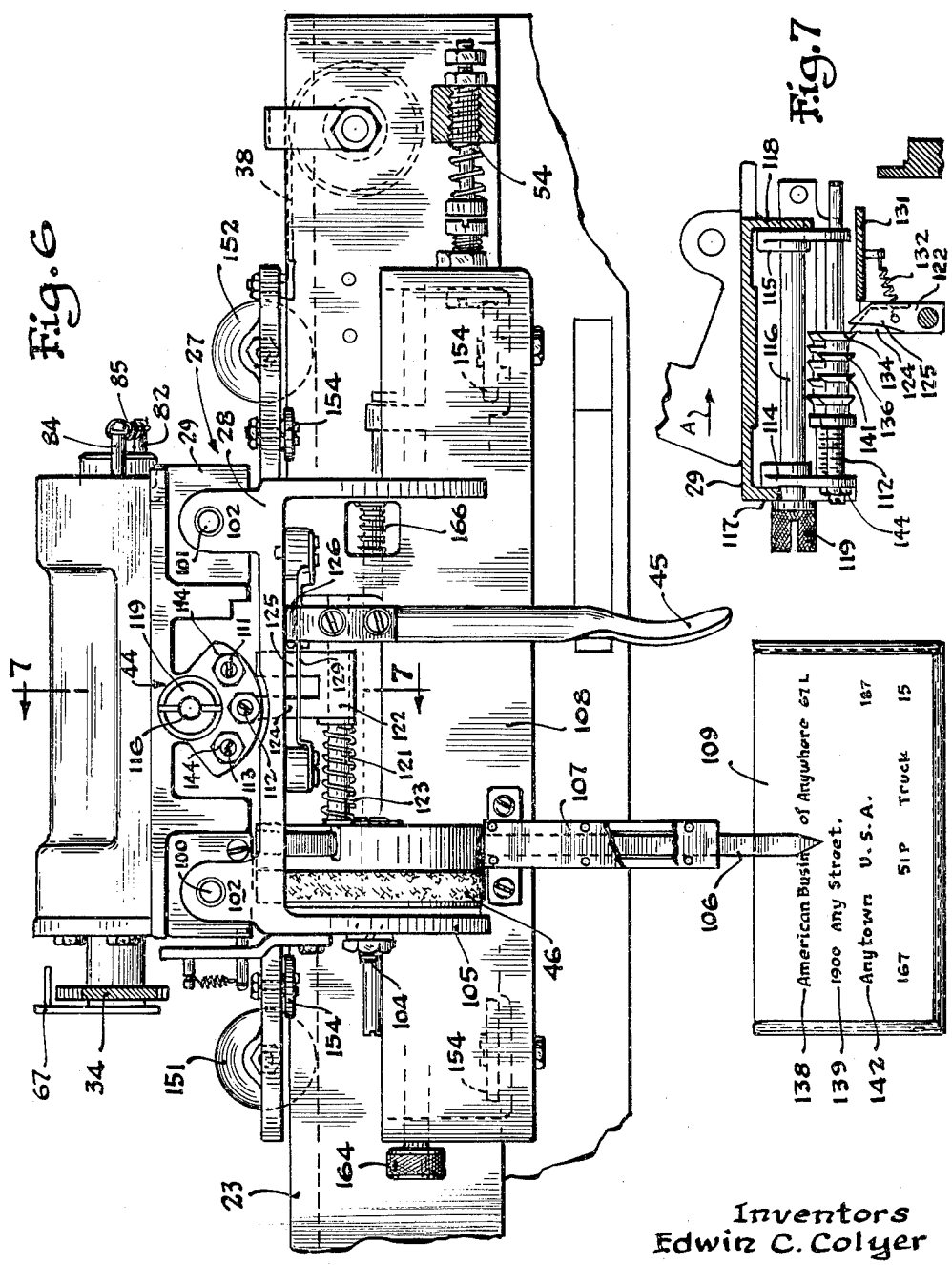
Inventors
Edwin C. Colyer
George W. Brown
By Wallace and Cannon
Attorneys

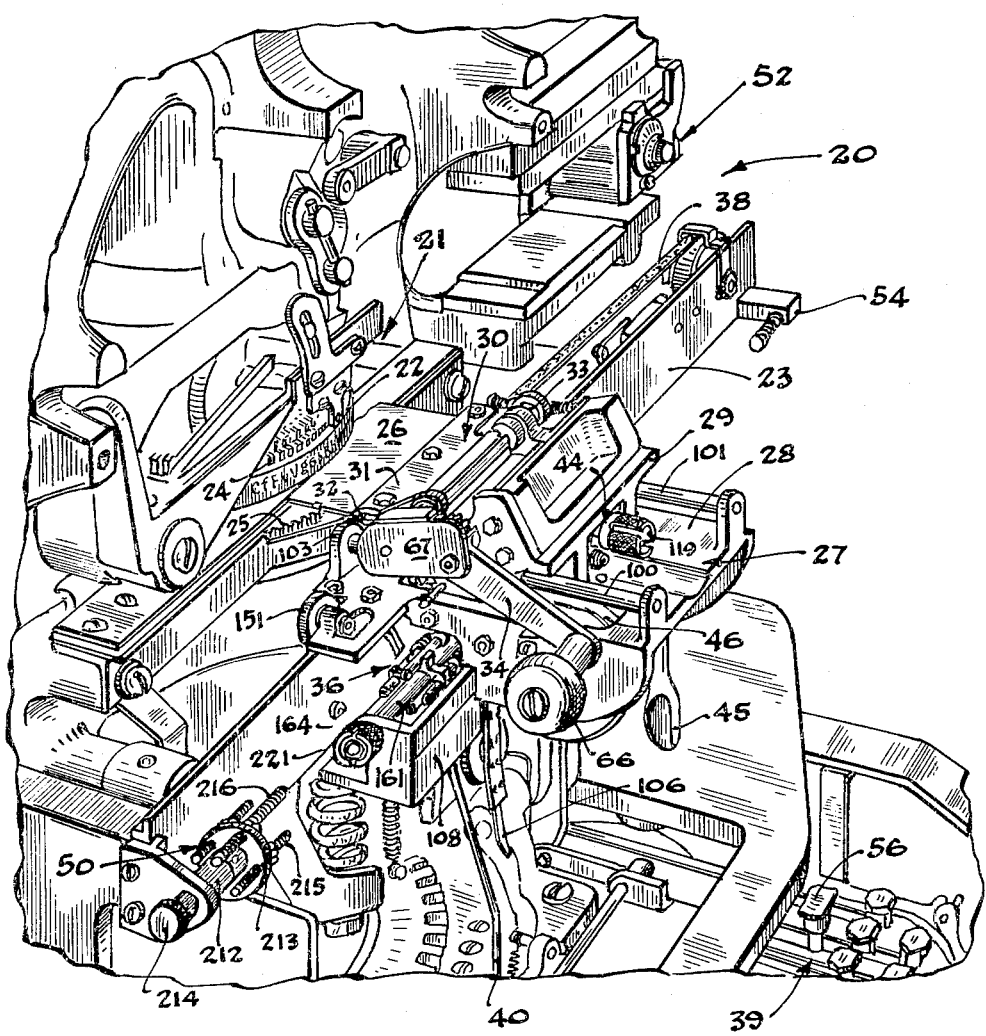

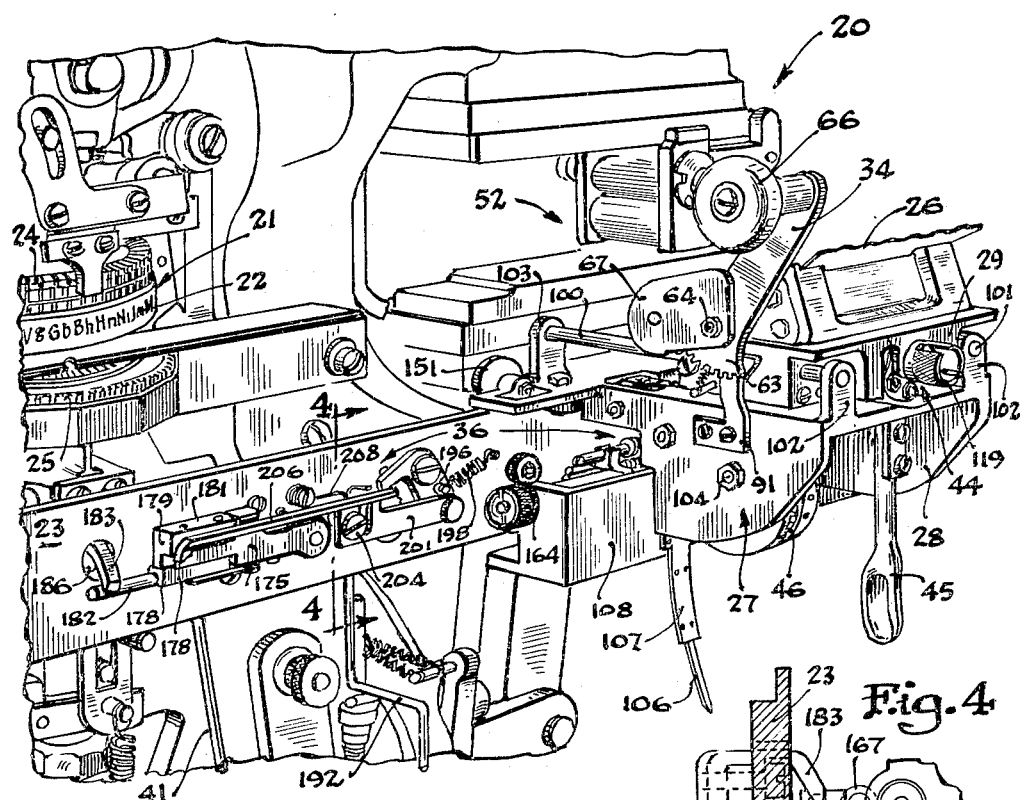
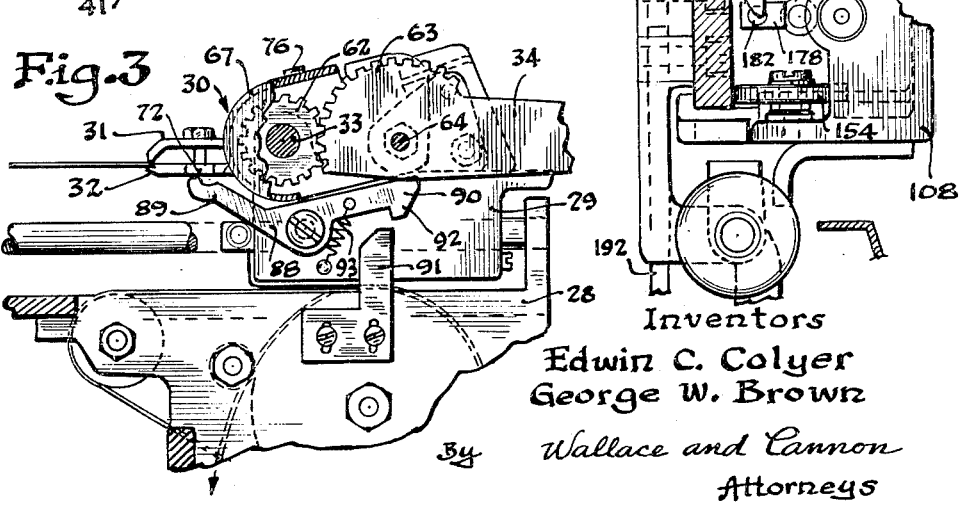

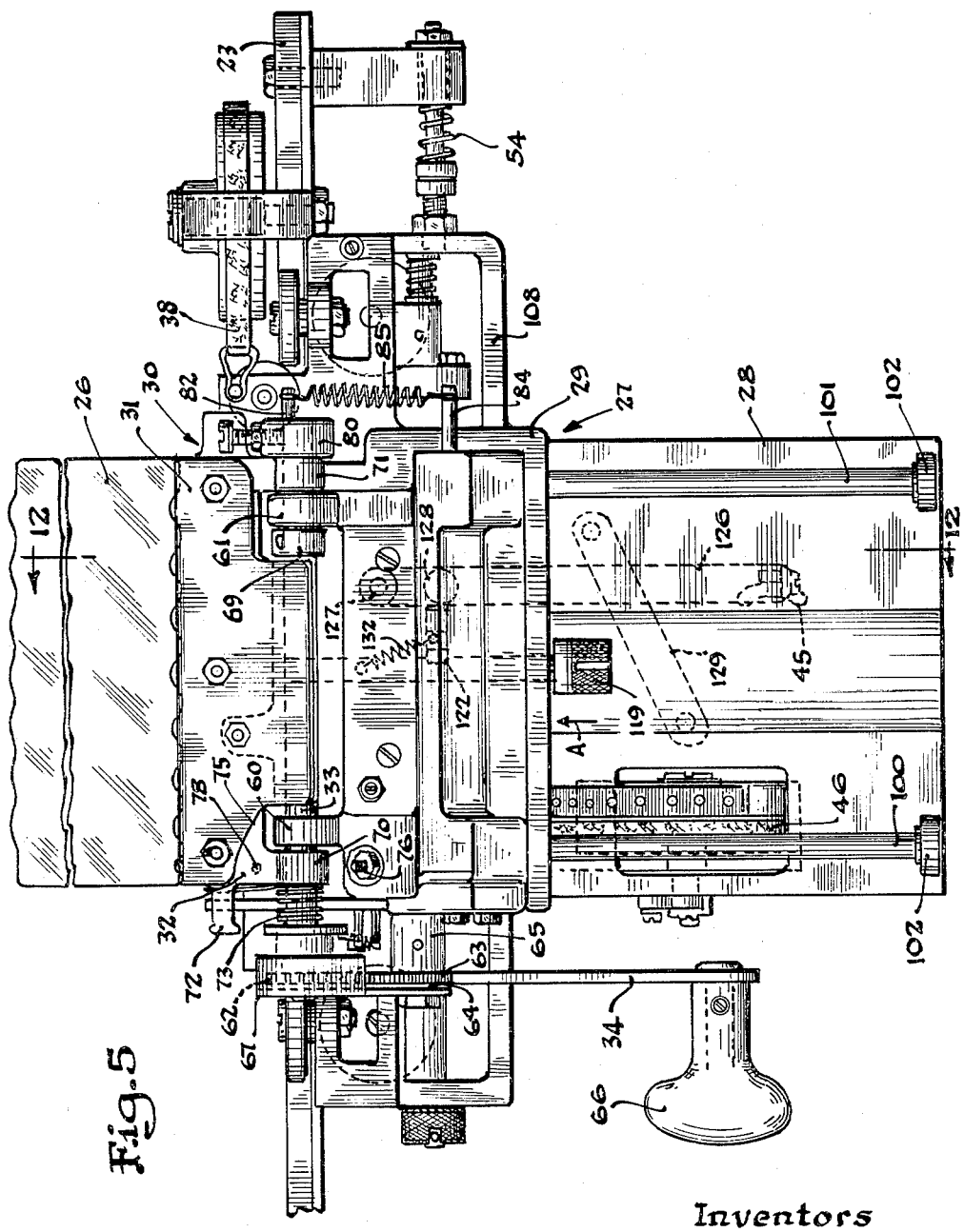

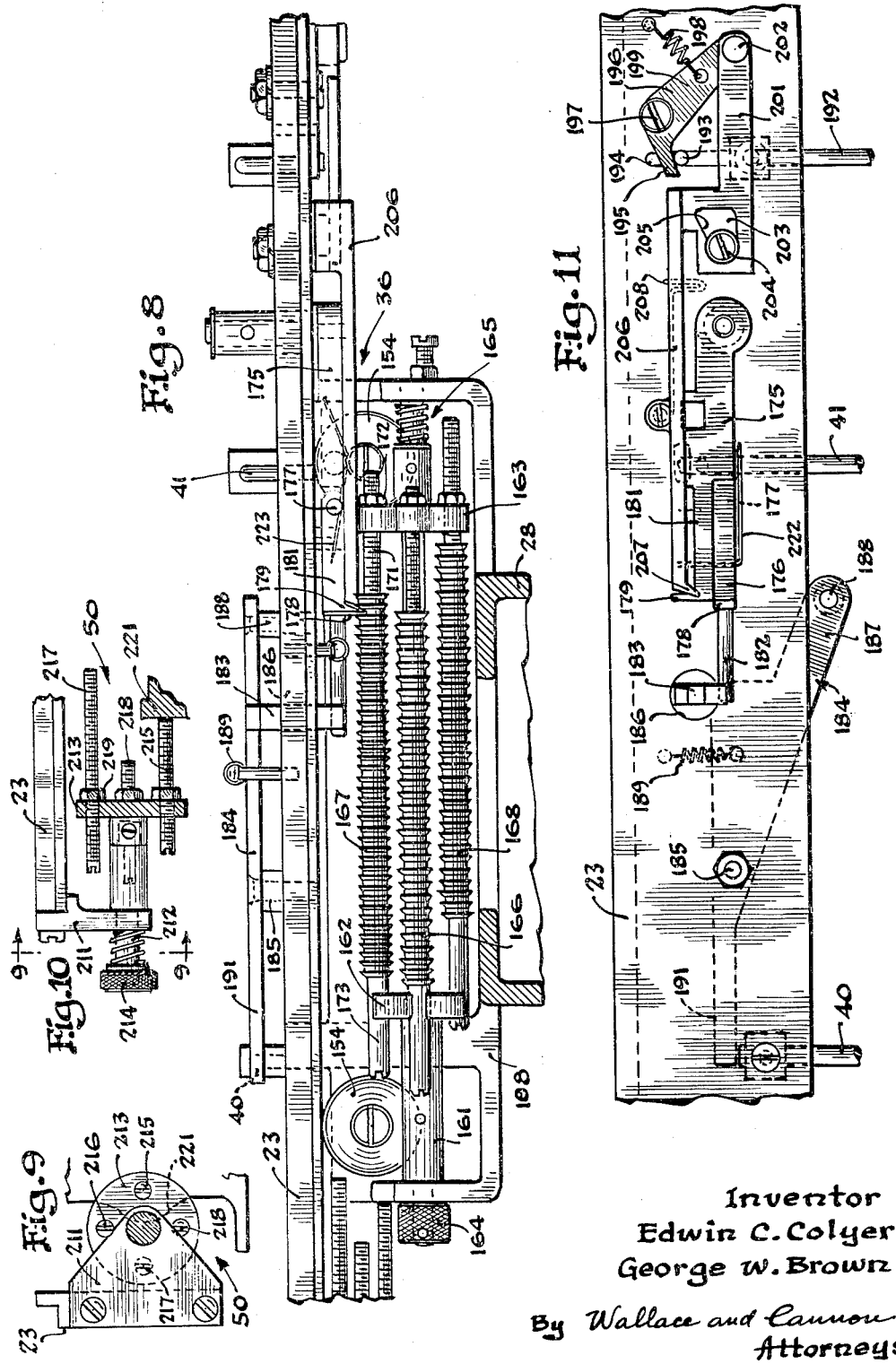

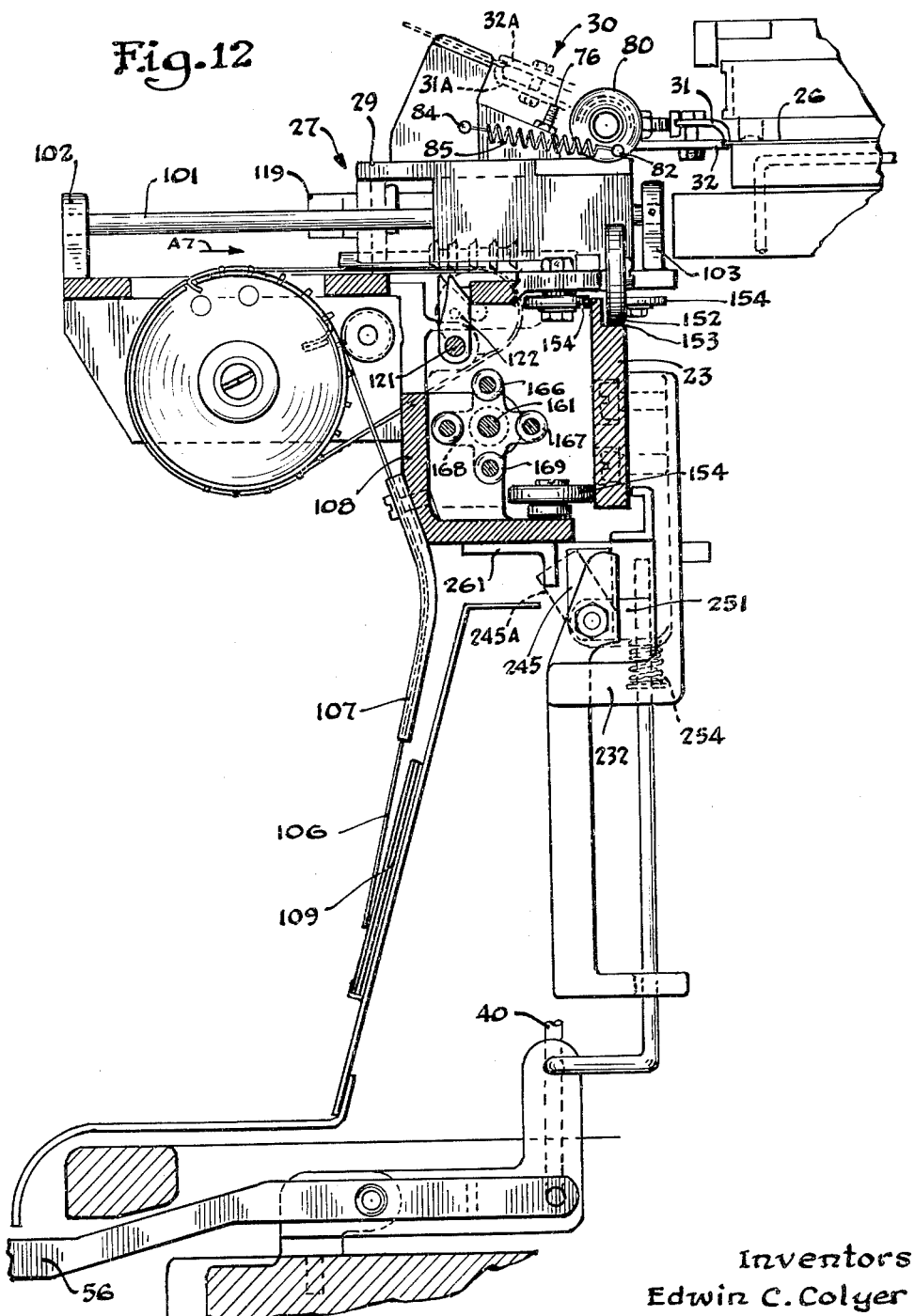

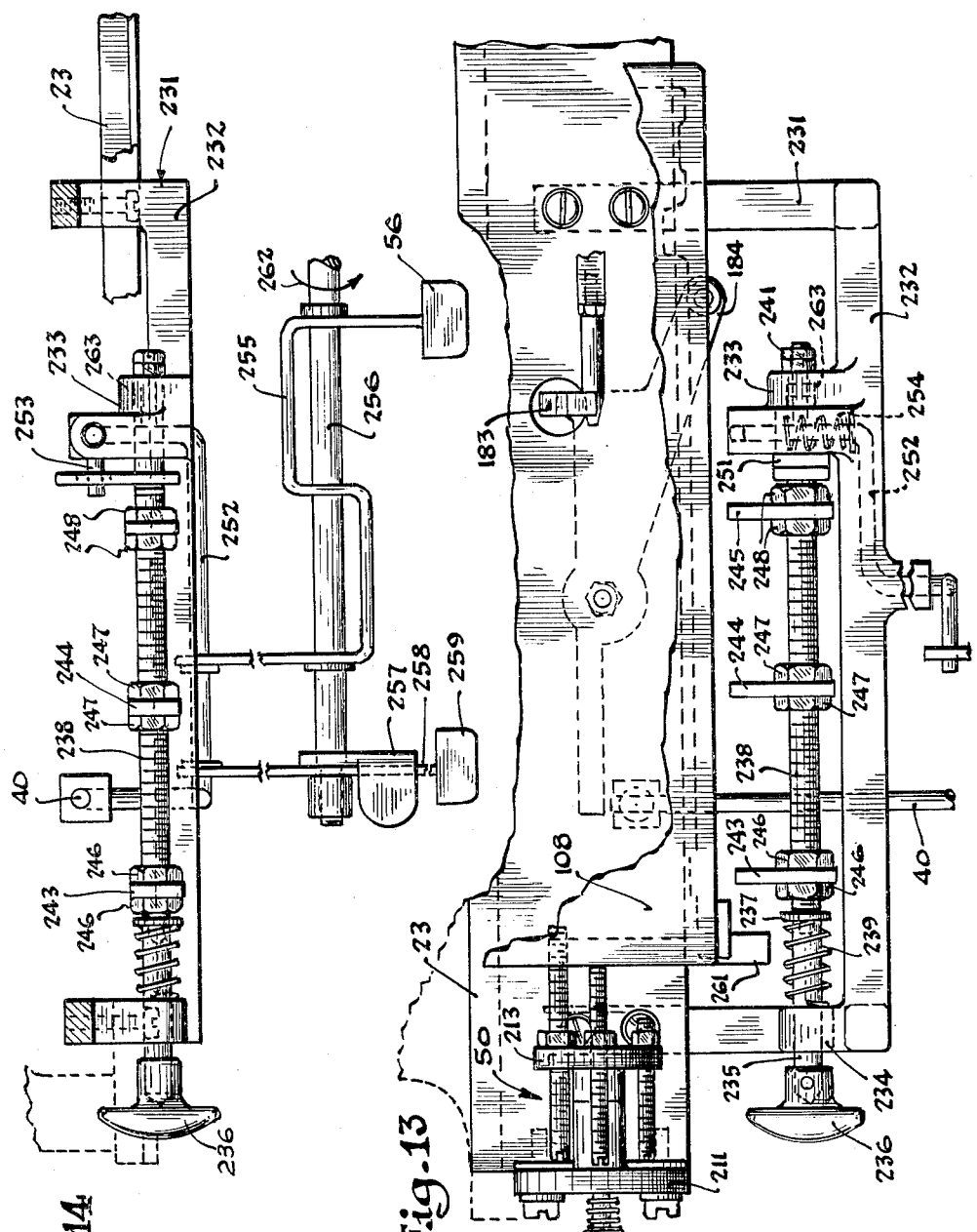

Inventors
Edwin C. Colyer
George W. Brown
By Wallace and Cannon
Attorneys

Sept. 12, 1961  E. C. COLYER ET AL  2,999,577
EMBOSSING MACHINE
Filed Dec. 5, 1958

Inventors
Edwin C. Colyer
George W. Brown
By Wallace and Cannon
Attorneys

United States Patent Office 2,999,577
Patented Sept. 12, 1961

2,999,577
EMBOSSING MACHINE
Edwin C. Colyer and George W. Brown, Willoughby, Ohio, assignors to Addressograph-Multigraph Corporation, Cleveland, Ohio, a corporation of Delaware
Filed Dec. 5, 1958, Ser. No. 778,418
14 Claims. (Cl. 197—6.6)

This invention relates to embossing machines and more particularly to a carriage and carriage control apparatus for use in embossing machines.

Embossing machines employed in the preparation of printing devices, such as the printing plates utilized in mailing and other applications and the embossed printing devices frequently employed in connection with credit transactions and the like, may be required to emboss a variety of different kinds of printing devices with any one of a number of different kinds and sizes of type characters. Previously known embossing machines have, in general, been sufficiently versatile to accommodate a number of different type sizes and have met the requirements of the art in this regard. With the advent of embossed credit plates, and particularly plastic credit plates, however, the requirements for versatility in embossing machines of this kind have increased substantially. This is particularly true where the machines are utilized to emboss printing devices for different users engaged in different fields of activity. Under these circumstances, a single machine may be required to handle a relatively large number of different type sizes and styles and also to provide for a substantial number of different spacing and other layout arrangements.

It is an object of the invention, therefore, to adapt an embossing machine for use with a substantial number of different type sizes and styles by means which require only minor adjustment of the machine.

A more specific object of the invention is to provide for adjustment of the character spacing movements of an embossing machine carriage, in accordance with the requirements of different sizes and styles of type and the spacing requirements for different kinds of printing devices, by means of a simple adjustment of the embossing machine and without requiring replacement of component parts of the machine.

Another object of the invention is to provide for quick and convenient substitution of character spacing escapement devices, in an embossing machine, and at the same time to provide for rapid and convenient substitution of different line spacing escapement devices therein.

Another object of the invention is to provide a new and improved arrangement for gripping a printing device, in an embossing machine, by means which afford a positive action yet which require only minimum effort on the part of the operator.

A further object of the invention is to speed up the mounting and removal of printing devices from the workholder of an embossing machine.

Another important object of the invention is to provide for rapid and convenient adjustment of the line spacing control for the carriage of an embossing machine without requiring replacement of parts or major adjustment of the machine.

A more specific object of the invention is to adjust an automatic embossing machine to any one of a plurality of different line spacing requirements by replacing a portion of the line spacing escapement of the machine without any substitution of parts.

An additional object of the invention is to adjust the margins of the embossed data produced by an embossing machine in an efficient and convenient manner without requiring individual adjustment of any substantial portion of the machine.

In many applications in which embossed printing devices are employed, tabular arrangement of the embossed material is highly desirable. For example, it may be desirable to afford spacing between the individual parts of a serial number incorporated in an embossed credit plate. Heretofore, electrically controlled tabular devices have been available as separate attachments for embossing machines. It is preferable, however, that the tabulator be incorporated directly into the embossing machine mechanism and that it be operated as a part of and in conjunction with other devices in the machine.

A further object of the invention, therefore, is to provide for tabulation in an embossing machine by means which cooperates with other mechanism already present in the machine.

A more specific object of the invention is to effect tabulation, in an embossing machine, by a simple mechanical device which utilizes the normal carriage-release mechanism of the machine in carrying out the desired tabulation operation.

Another object of the invention is to provide for tabulation, in an automatic embossing machine, by means of a single device which may be utilized with a wide variety of different type sizes and styles and which is essentially independent of the type size and style currently in use in the embossing machine.

Embossing machines are frequently provided with plate rolling devices to roll the printing plates or other articles embossed in the machine in order to assure maximum uniformity in the height of the embossed characters. In a keyboard or automatically controlled embossing machine, it is necessary to afford some means for holding the carriage of the machine at a plate rolling position. This latching or holding mechanism should be positive and accurate in action; but should automatically release the carriage upon completion of a plate rolling operation in order to expedite further operation of the embossing machine.

Another object of the invention, therefore, is to automatically latch the carriage of an embossing machine at a plate rolling station upon movement of the carriage to that station.

A further object of the invention is to automatically and rapidly release an embossing machine carriage for movement from a plate rolling station upon completion of the plate rolling operation.

A more specific object of the invention is to provide an automatic latching mechanism, at the plate rolling station of an embossing machine, which is positive in its latching action yet which is released virtually instantaneously upon completion of a plate rolling operation.

Other and further objects of the present invention will be apparent from the following description and claims and are illustrated in the accompanying drawings which, by way of illustration, show a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

FIG. 1 is a fragmentary perspective view of an embossing machine constructed in accordance with a preferred embodiment of the invention and showing the carriage of the machine at one operating position;

FIG. 2 is a fragmentary perspective view of a portion of the embossing machine showing the carriage at a different operating position;

FIG. 3 is a detail elevation view, on an enlarged scale, of a portion of the embossing machine carriage and of a work holder mounted upon that carriage;

FIG. 4 is a detail sectional view, taken approximately on line 4—4 in FIG. 2, illustrating a part of the tabulator mechanism and carriage mounting arrangement of the embossing machine;

FIG. 5 is a plan view of the embossing machine carriage;

FIG. 6 is an elevation view of the embossing machine carriage;

FIG. 7 is a sectional view taken along line 7—7 in FIG. 6 and showing the line-space escapement mechanism of the embossing machine carriage;

FIG. 8 is an elevation view of the character-spacing escapement mechanism for the embossing machine carriage;

FIG. 9 is an elevation view of the limit stop device for the embossing machine carriage;

FIG. 10 is a plan view of the limit stop device illustrated in FIG. 9;

FIG. 11 is an elevation view of the actuating mechanism for the line spacing escapement mechanism and the carriage release device of the embossing machine;

FIG. 12 is a sectional elevation view of the carriage of the embossing machine and also shows the key-operated actuating linkage for the tabulator mechanism;

FIG. 13 is an enlarged fragmentary detail view of the tabulator mechanism;

FIG. 14 is a detail plan view of the tabulator mechanism;

General description and operation

Figure 15:
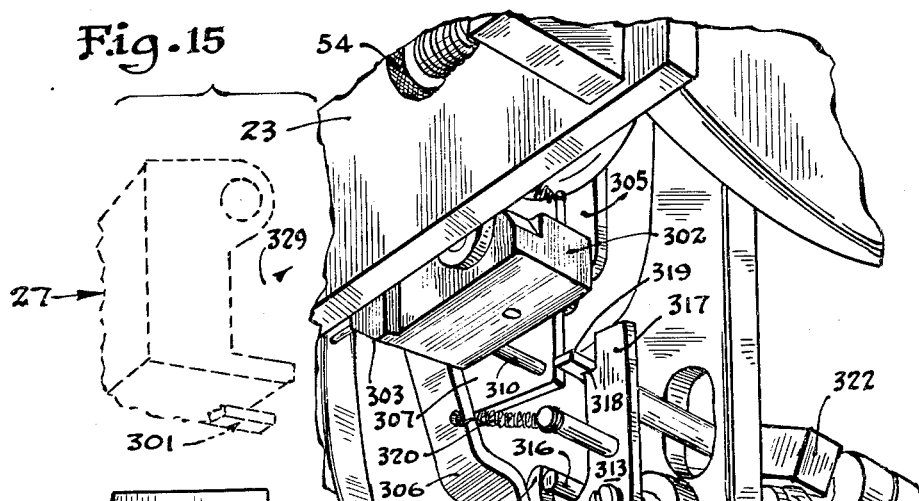
FIG. 15 is a fragmentary perspective view of the latch mechanism at the plate rolling station of the embossing machine, taken from below the guide rail at the right hand front end thereof.

The embossing machine 20 illustrated in FIGS. 1 and 2, which constitutes a preferred embodiment of the invention, includes an embossing station 21 at which a rotary die head 22 is located. In many respects, the embossing machine is conventional in form and is substantially similar in construction and operation to the embossing machine described in Patent No. 1,831,103 to Duncan et al., dated November 10, 1931. The die head 22 is supported by a suitable frame, the frame including an elongated frame member 23 which extends across the front portion of the embossing machine. The die head includes a plurality of individual character punches and dies 24 and 25 and a suitable actuating mechanism for driving the punches and dies toward each other in an embossing operation to emboss a printing plate or like device 26 when the latter is properly positioned in the embossing station 21 of the machine. Inasmuch as the present invention is not concerned with the construction or operation of the die head 22, the punches or dies 24 and 25, or the actuating mechanism for the die head, no detailed description of this part of the embossing machine is necessary herein. Rather, it should be understood that any desired operating mechanism for the punches and dies may be used in the embossing machine together with any suitable die head structure.

The embossing machine 20 further includes a carriage 27 which is mounted upon the frame member or support rail 23 and which is slidably movable along the support rail. The carriage 27 includes a first carriage member 28 mounted upon the support rail 23 as described more fully hereinafter and a second carriage member 29 which is mounted upon the first carriage member 28. The second carriage member 29 is slidably movable with respect to the first carriage member in a direction substantially normal to the direction of movement of the first carriage member 28 along the support rail 23. Thus, the carriage 27 effectively provides for movement in two co-ordinate directions with respect to the embossing station 21 of the machine 20.

A work holder 30 is mounted upon the second carriage member 29 for movement therewith. It is the work holder 30 which grips and supports the printing plate 26 or other similar device and positions that device in the embossing station 21 for an embossing operation. The work holder 30 is movable between an embossing position, illustrated in FIG. 1, in which the printing plate 26 is effectively located in the embossing station 21 of the machine, and a loading position, as illustrated in FIG. 2, in which a printing plate or other similar device may be inserted in or removed from the work holder. The work holder 30 includes a pair of jaw members 31 and 32 which are mounted upon a work holder shaft 33, the shaft being journaled in the second carriage member 29. The work holder further includes an operating handle 34 mechanically connected to the shaft 33; the operating handle 34 is utilized to actuate the shaft 33 and to move the work holder from its normal or embossing position to its loading position as described more fully hereinafter.

The carriage 27 is controlled in its operation by two separate escapement mechanisms. The first or character-spacing mechanism 36 is utilized to control movements of the first carriage member 28 along the support rail 23, the actuating force necessary for such movement being provided by biasing means including a spring 38 which continually urges the carriage toward the right hand end of the support rail 23 as seen in FIGS. 1 and 2. This escapement mechanism, which comprises one of the important features of the invention, is described in substantial detail hereinafter. Operation of the escapement mechanism is controlled in conventional manner from a keyboard 39, a portion of which is illustrated in FIG. 1. In addition, the escapement mechanism includes a carriage release device which may be utilized to release the carriage 27 for movement to the extreme right hand end of the support rail 23 as shown in FIG. 2. The carriage release is actuated by a carriage release rod 40 controlled from one of the keys on the keyboard. The carriage release portion of the escapement mechanism is also mechanically connected to a tabulating device, of which only the tabulator actuating rod 41 is illustrated in FIG. 2. The tabulator mechanism, which is also controlled from the keyboard 39, constitutes a further important feature of the invention and is described in detail hereinafter.

Another important feature of the carriage 27 is a second or line-spacing escapement mechanism 44, which is actuated by means of a lever 45. The moving force required for operation of this portion of the carriage mechanism is provided by a biasing spring 46 which normally tends to impel the second carriage member 29 toward the embossing station 21 of the machine. Incremental movement of the second carriage member 29 in this direction is controlled by the escapement mechanism 44 as described in complete detail hereinafter.

As illustrated in FIG. 1, a limit stop device 50 is mounted upon the left-hand end of the support rail 23. The device 50 is utilized to limit movement of the carriage 27 toward the left, as seen in FIG. 1, and is co-ordinated with the escapement mechanism 36 as described more fully hereinafter. The limit stop device 50 thus determines the starting point for each line of type characters or other embossures upon the imprinting plate or like device 26.

The embossing machine 20 is also provided with a plate rolling station 52 which is located adjacent the right-hand end of the support rail 23 as seen in FIGS. 1 and 2. The plate rolling station 52 may be of conventional construction; for example, the plate rolling mechanism may be of the kind described in Patent No. 1,239,679 to Duncan issued September 11, 1917. The work holder 30 and the carriage 27 may be utilized to position the printing plate 26 or like device in the plate rolling station 52 in the usual manner to effect a rolling operation upon the printing plate after embossing. For this purpose, a limit stop 54 is mounted upon the right-hand end of the support rail 23 to properly position the carriage for a plate rolling operation. In addition, a latching mechanism is provided for latching the carriage 27 in a plate rolling position for this part of the operating cycle of the embossing machine 20 as described more fully hereinafter.

The operation of the embossing machine 20 may be considered as starting with insertion of a blank printing plate or similar device 26 in the work holder 30. For this purpose, the operating handle 34 is employed to move the work holder to its loading position and a printing plate 26 is then inserted between the jaws of the work holder, the position of the plate during this operation being illustrated in FIG. 2. It should be understood that the term "printing plate" as employed throughout this specification and in the appended claims includes both metal and plastic printing devices and other similar devices which require embossure with individual type characters or the like.

Once the plate 26 has been inserted in the work holder, the operating handle 34 is employed to move the work holder 30 to its normal or embossing position, placing the plate in alignment with the embossing station 21 as shown in FIG. 1. Thereafter, the carriage 27 is moved to the extreme left-hand end of the support rail 23 (see FIG. 1) to a position determined by engagement with the limit stop mechanism 50. The carriage member 29 is advanced to the first position of the escapement mechanism 44 and the machine is then ready for an embossing operation.

During the embossing operation, a first line of type is embossed upon the plate 26 under the control of the character keys and the spacer keys of the keyboard 39 in conventional manner. When the first line is completed, the lever 45 is employed to actuate the escapement mechanism 44 and advance the carriage member 29 one line space into the embossing station 21 and also to move the carriage again to the initial line-starting position in which it engages the limit stop 50. This procedure is continued until the entire desired message or other data is embossed upon the printing plate. In the course of the embossing operation, it may be desired to start different parts of the embossed data at given spaced points upon the printing plate. For this purpose, the tabulator mechanism of the machine is actuated by means of the tabulator key 56 and tabulator control rod 41 as described more fully hereinafter. Of course, character spacing movement of the carriage 27 is effected, during the embossing operation, by the escapement mechanism 36, which in turn is controlled by the character and space keys of the keyboard 39.

After the desired data has been embossed upon the printing plate 26 as described hereinabove, the carriage 27 may be moved to the position illustrated in FIG. 2, adjacent the plate rolling station 52, by actuation of the carriage release control rod 40, which is connected to one of the keys on the keyboard 39. The position reached by the carriage is determined by the limit stop 54 and the carriage is latched in position by the latching device described hereinafter. The plate 26 is then rolled in the usual manner, after which the operating handle 34 is employed to move the work holder 30 to its loading position and the plate 26 is removed from the work holder. At this time, a second printing plate or like device may be inserted in the work holder to prepare the machine for the next subsequent embossing operation.

*The work holder*

The work holder 30 is best illustrated in FIGS. 1, 2, 3, 5 and 12 of the drawings. As illustrated therein, the work holder comprises the shaft 33, which is journaled in a pair of bosses 60 and 61 on the upper carriage member 29 of the carriage 27. At the left-hand side of the work holder 30, as viewed in FIG. 5, the shaft 33 is extended beyond the boss 60 and a spur gear 62 is affixed to the outboard end of the shaft. A segmental drive gear 63 is included in the work holder and is journaled upon a stub shaft 64 which projects outwardly of the carriage member 29. A bushing 65 separates the gear 63 from the carriage member 29. As best indicated in FIG. 3, the segmental drive gear 63 is preferably formed as an integral part of the operating handle 34, the opposite end of the handle 34 being provided with a knob 66 (FIG. 5) to facilitate actuation thereof by a machine operator. The drive gear 63 is disposed in meshing engagement with the spur gear 62; if desired, the two gears may be covered by a suitable guard 67 which is partially cut away in FIG. 3 to show the meshing relationship of the two gears.

The upper jaw member 31 is affixed to the shaft 33 for rotation therewith by suitable means such as the collar 69, although any desired method of anchoring the upper jaw member to the shaft may be adopted. The lower jaw member 32, on the other hand, includes a pair of bearing portions 70 and 71 which encompass the shaft 33 immediately adjacent the bosses 60 and 61, respectively, on the outboard sides thereof (see FIG. 5). The lower jaw member further includes an extension lug or projection 72 which engages one end of a torsion spring 73. The major portion of the torsion spring 73 is mounted in encompassing relation to the shaft 33 and the outboard end of the spring is anchored to the shaft. Consequently, the torsion spring 73 affords a biasing means which urges the lower or second jaw member 32 toward contact with the first or upper jaw member 31 to grip the blank printing device 26 between the two jaw members.

At one side of the upper jaw member 31, as best seen in FIG. 5, a portion 75 of the upper jaw member is cut away to expose the underlying portion of the lower jaw member 32. An adjustable stop member 76 is mounted upon the carriage member 29 in a position such that the stop member is located within the path of arcuate movement of the lower jaw member but cannot engage the upper jaw member. The point of contact between the stop member 76 and the lower jaw member 32 is indicated in FIG. 5 by the reference numeral 78.

The end of the shaft 33 opposite the spur gear 62 is provided with a collar 80 which is mounted upon the shaft for rotation therewith and which is effective to retain the shaft in position on the upper carriage member 29. An eccentric pin 82 is affixed to the collar 80, as illustrated in FIGS. 5 and 12, and is connected to a pin 84 extending outwardly from the upper carriage member 29 by a tension spring 85. The spring 85 thus affords an off-center biasing means which tends to maintain the work holder 30 in its normal or embossing position as illustrated in FIGS. 5 and 12 or in its elevated or loading position, as indicated by dash outline 31A, 32A in FIG. 12, whenever the work holder is moved to the loading position.

The work holder further includes a latching device comprising a bell crank 88 which is pivotally mounted upon the carriage member 29, as best indiacted in FIG. 3. The bell crank includes one arm 89 which extends toward contact with the lower jaw member 32 of the work holder and which is engaged by the lower jaw member projection 72, when the work holder is in its embossing position. The bell crank 88 further includes a second arm 90 which is normally located closely adjacent to but in spaced relation with respect to a latch member 91 mounted upon the lower carriage member 28. The arm 90 of the bell crank is provided with a latch dog 92 for engaging the latch member 91, as described more fully hereinafter. A spring 93 is connected to the bell crank and normally tends to bias the bell crank towards rotation in a clockwise direction as seen in FIG. 3.

Operation of the work holder 30 is extremely simple and convenient. When it is desired to load a plate, such as the plate 26, into the embossing machine 20, the knob 66 is grasped by the operator and is employed to rotate the handle 34 in a counter-clockwise direction, as seen in FIGS. 1, 2, and 3, thereby bringing the work holder jaws 31 and 32 to the loading position illustrated by dash outlines 31A and 32A in FIG. 12. As the jaws approach the loading position, the lower jaw 32 engages the adjustable stop 76 and is interrupted in its movement before the upper jaw 31, which continues to rotate until it engages the upper carriage member 29. Consequently, the two jaws are spread or separated with respect to each other. The mechanical advantage afforded by the handle 34 and the gears 62 and 63 substantially minimizes the effort which would otherwise be required to open the two jaws against the biasing force exerted by the torsion spring 73.

With the jaws open, the plate 26 is inserted therein and the handle knob 66 is released by the operator. Upon release, the spring 73 brings the two jaws together, firmly gripping the plate 26 between the jaws and holding the plate in the position illustrated in FIG. 2. The jaws are, of course, held in this position by the over-center toggle arrangement comprising the spring 85 and the eccentric pin 82 (see FIG. 12). The loading of a plate into the work holder 30 is usually carried out with the carriage at the right hand end of the machine in the position illustrated in FIG. 2, although this is not essential. Once the plate is loaded, the knob 66 may be employed to rotate the handle 34 in a clockwise direction, thereby returning the work holder jaws 31 and 32 to their normal operating position in alignment with the die head 21 of the embossing machine. With the work holder and plate in operating position, the carriage may be moved to the left across the front of the machine to the working position illustrated in FIG. 1. In this position, the machine may be operated to emboss the plate 26 in the manner described in further detail hereinafter.

After the plate 26 has been embossed, and usually after a plate rolling operation, the plate may be removed from the work holder in order to permit embossing of another plate. To remove the plate 26 from the work holder, the carriage is preferably again moved to the right hand portion of the machine and the knob 66 is employed to actuate the work holder to its loading position, as described hereinabove. The work holder jaws may be actuated to the loading position with the upper carriage member 29 in advanced position; usually, however, it is desirable to move the upper carriage member outwardly of the embossing machine to the extreme limit of its travel in order to assure adequate clearance of the plate and jaws with respect to other components of the embossing machine. Using this technique, the upper carriage member 29 is moved to the extreme right hand end of its travel, as seen in FIG. 3. The rotational movement of the jaws 31 and 32, moving to the loading position, releases the projection 72 from engagement with the arm 89 of the bell crank 88. Consequently, as long as the jaws of the work holder are in elevated or loading position, the bell crank latch dog 92 engages the latch member 91 and prevents accidental forward movement of the work holder into the embossing machine. Engagement of the latching elements is, of course, effected automatically by the spring 93, which pulls the bell crank arm 90 downwardly to engage the dog 92 with the latch member 91. When the work holder is returned to its normal operated position, as described hereinabove, the projection 72 on the lower jaw member 32 engages the bell crank arm 89 and releases the bell crank from latching engagement with the member 91. Thus, the latch requires no attention from the machine operator but rather constitutes an automatic safety feature preventing premature advancement of the work holder into the embossing station of the machine 20.

*Upper carriage and line spacing escapement*

The work holder 30 for the embossing machine 20 is mounted upon and forms a part of the upper carriage member 29. The upper carriage member 29, in turn, is supported upon the lower carriage member 28 and is movable with respect to the lower carriage member, the direction of movement being approximately normal to the guide rail 23 of the embossing machine. Movement of the upper carriage member 29 with respect to the lower carriage member 28 is controlled by the escapement mechanism 44 and the associated control lever 45. The mounting arrangement for the upper carriage member and the line spacing escapement mechanism are best illustrated in FIGS. 5, 6 and 7, taken together with the perspective views of FIGS. 1 and 2.

By reference to FIGS. 1, 5 and 6, it is seen that a pair of support and guide bars 100 and 101 are mounted upon the lower carriage member 28 and extend transversely thereof in a direction approximately normal to the guide bar 23. At the end of the carriage member 28 farthest from the guide bar 23, the rods 100 and 101 are mounted in a pair of bosses 102. Similarly, a pair of bosses 103 (only one is shown in the drawing) are utilized to support the opposite ends of the rods 100 and 101. The two rods 100 and 101 extend through suitable apertures in the upper carriage member 29. Thus, the guide and support rods 100 and 101 serve to support the upper carriage member 29 and at the same time guide the upper carriage member for sliding movement in a direction normal to the guide bar 23.

As noted hereinabove, a biasing spring 46 is mounted upon the lower carriage member 28 and is connected to the upper carriage member 29. The spring 46, which is substantially similar to the spring 38, exerts a continuous biasing force on the upper carriage member 29 urging the upper carriage member toward movement along the guide rods 100 and 101 in the direction indicated in FIGS. 5, 7 and 12 by the arrow A. The spring 46 is supported upon a stub shaft 104 which is mounted in an extension portion 105 of the lower carriage member 28. On the same shaft there is mounted a resilient indicator member 106, the upper portion of which is coiled around the shaft 104 and the lower portion of which extends through a guide enclosure 107. The guide channel 107 is mounted upon a transverse portion 108 of the lower carriage member. The indicator member 106 is secured to the spring 46 for rotational movement therewith. The lower end of the indicator 106 projects over a character and line spacing index scale 109 (see FIG. 6).

The escapement mechanism 44 comprises three individual escapement racks 111, 112 and 113. The three escapement racks are mounted upon and extend between a pair of brackets 114 and 115 which are secured to an escapement rack shaft 116 (see FIG. 7). The shaft 116, in turn, is journaled in and supported by a pair of extension portions or brackets 117 and 118 on the upper carriage member 28. A knurled knob 119 is mounted upon one end of the shaft 116 and is preferably provided with a spring latching arrangement engaging both the knob and the extension portion 117 of the upper carriage member 29 to prevent rotation of the knob and the shaft except when the knob is pulled outwardly of the extension portion 117.

Immediately below the escapement racks 111—113, there is mounted a fixed shaft 121, this shaft being mounted upon the lower carriage member 28. An escapement pawl device 122 is mounted upon the shaft 121 for sliding movement thereon; a biasing spring 123, mounted upon the left hand side of the shaft 121 as seen in FIG. 6, urges the pawl device 122 to the right and toward the normal or unactuated position shown in FIG. 6. Pawl device 122 includes a pair of escapement pawls 124 and 125 which extend upwardly toward engagement with the escapement racks. As indicated in FIG. 7, the two pawls 124 and 125 are not aligned with each other but are rather displaced from each other in a direction parallel to the axis of the shaft 116.

The escapement operating lever 45 comprises a vertical extension of a horizontal actuating lever 126 which is pivotally mounted on the underside of the lower carriage member 28, as indicated by reference numeral 127 in FIG. 5. A roller 128 is mounted upon the lever 126 in position to engage the pawl device 122. More specifically, the roller 128 engages the right hand side of the pawl 125, as viewed in FIGS. 5 and 6. The outer end of the lever 126 is supported by a bracket 129, the bracket being mounted on the lower carriage member 28. The pawl device 122 is maintained in the desired vertical alignment with respect to the escapement racks by engagement with a guide member 131 which constitutes a part of the lower carriage member 28. A spring 132, which is connected to the pawl device 122 and to the guide member 131, maintains the pawl device in constant contact with the guide member.

In considering the operation of the escapement mechanism 44, it may first be assumed that the upper carriage member 29 is initially located at the rear or outer end of its travel on the lower carriage member 28, this being the position illustrated in FIG. 2. Furthermore, it may be assumed that the three escapement racks are in the position illustrated in FIGS. 6 and 7 with the rack 112 disposed immediately below the shaft 116. Starting from this position, and with the above noted assumption with respect to the position of the escapement racks, when the latch 91, 92 is released the spring 46 drives the upper carriage member 29 toward the embossing machine, as indicated by arrow A, until the first lug or projection 134 on the rack 112 engages the pawl 124. The engagement of these two members determines the first line position for embossing and thus conditions the carriage 27 for embossure of a first line of data upon the plate 26 (see FIG. 1).

After the first line of data has been embossed, the lever 45 is actuated to return the carriage 27 to its initial embossing position as described more fully hereinafter and also to actuate the escapement mechanism 44. Thus, when the machine operator moves the lever 45 to the left as seen in FIG. 6, the roller 128 forces the pawl device 122 to the left against the biasing force of the spring 123. As the pawl device moves to the left, the pawl 124 is released from engagement with the escapement lug 134 and the pawl 125 is interposed in the path of movement of the escapement lug. However, and as best indicated in FIG. 7, the axial displacement of the pawls with respect to the shaft 116 permits the upper carriage member to move only a relatively short distance toward the embassing station. When the operator releases the lever 45, the spring 123 forces the pawl device 122 back toward the right, as seen in FIG. 6. The pawl device, in turn, forces the composite lever 45, 126 back to its original position. Moreover, the movement of the pawl device 122 back to its original position releases the pawl 125 from its engagement with the escapement lug 134. Consequently, the upper carriage member 29 is permitted to move an additional distance toward the embossing station of the machine until that movement is interrupted by engagement of the pawl 124 with the next escapement lug 136. In this manner, the upper carriage member is advanced one complete line space into the embossing machine and the machine is thus conditioned for a second line of embossure.

With the upper carriage member 29 in position for embossing of the first line on the plate 26, the indicator 106 is aligned with the first index line 138 on the indicator 109. As long as the upper carriage member remains in this position, the indicator does not change its location, vertically, on the index scale. As soon as the line spacing escapement mechanism is actuated to move the upper carriage member 29 to the second line position, however, as described hereinafter, the indicator 106 advances into registry with the second index line 139 on the scale 109. The movement of the indicator 106 occurs automatically, since the indicator is connected with the actuating spring 46 and moves with the spring as the spring drives the upper carriage member 29 forwardly in the direction indicated by arrow A (FIG. 5).

With the upper carriage member 29 in position for the embossure of a second line of data on plate 26, the machine operator is, of course, able to carry out the embossing of this portion of the plate. When this has been accomplished, lever 45 may again be actuated to displace the pawl device 122 to the left, as seen in FIGS. 5 and 6, and may then be released to complete another line spacing movement of the escapement mechanism 44 in the same manner as described above. As a consequence, the pawl 124 is brought into engagement with the third escapement lug 141 on the rack 112 and the plate 26 is positioned for embossure of a third line of data thereon. At the same time, of course, the indicator 106 moves into registration with a third index position 142 on the scale 109.

The number of teeth or lugs upon the escapement rack 112 and the spacing between lugs is determined by the spacing requirements for the lines of embossed material upon the plate 26. The line spacing, on the other hand, is determined in part by the size of the lettering to be embossed and by the desired blank spacing between lines. For a given application, of course, it may be desirable to afford increased or decreased inter-line spacing on the embossed plate. Moreover, it is possible to employ many different type sizes in the embossing machine 20; consequently, a change in type size may make it desirable to vary the line spacing on the plate.

The escapement mechanism 44 provides for convenient and expeditious changing of the line spacing characteristics of the carriage 27. As best indicated in FIGS. 6 and 7, the pawl device 122 engages only the rack 112 when the escapement device 44 is in the illustrated position. Thus, the other two racks 111 and 113 are not used during the time that the rack 112 is in use. When it is desired to change the line spacing afforded by the escapement mechanism 44, the detented knob 119 is pulled outwardly and is rotated, rotating the shaft 116 and the brackets 114 and 115. In this manner, either of the racks 111 and 113 may be moved to a location directly below the shaft 116 and thus into position to be engaged by the pawl device 122. Assuming that the rack 111 is thus moved into operative position with respect to the pawl device, it is seen that the remaining racks 112 and 113 are displaced from the path of movement of the pawl device. When this has been accomplished, the knob 119 is released and latches the escapement device 44 in its new position. The rack 111 may have a greater or lesser number of teeth than the rack 112 and may afford a greater or lesser spacing between teeth. Since it is the rack which controls line spacing in the embossing operation, the above described simple change of the operating position of the line escapement mechanism quickly and effectively alters the inter-line spacing afforded by the mechanism.

Of course, the same operation may be carried out, rotating the shaft 116 in the opposite direction, to bring the rack 113 into operative position with respect to the pawl device 122. When this is done, a substantially different inter-line spacing may be provided, depending upon the number of teeth on the rack 113 and the spacing between those teeth. It is thus seen that the escapement mechanism 44 provides for three substantially different line spacings without requiring any substantial change in the embossing machine. Stated differently, the line spacing may be changed to three substantially different sizes at the will of the operator, the time required being only a few seconds. Of course, it is desirable to provide three different spacing index scales such as the index 109, which are matched to the three different escapement racks 111–113.

In those instances where the embossing machine 20 is required to handle a large variety of different type sizes and must afford a substantial number of different line spacings, it may be necessary to afford even more versatility in the operating characteristics of the escapement mechanism 44. For this reason, the racks 111–113 are not permanently mounted in the brackets 114 and 115. Instead, each rack is engaged in a suitable aperture in the bracket 115. The opposite end of the rack is threaded and projects through a corresponding aperture in the bracket 114. Thus, each rack may be removably mounted upon the two brackets simply by means of one nut, as illustrated by the three nuts 144 (see FIGS. 6 and 7).

*Lower carriage and character spacing escapement*

The character spacing escapement and related mechanisms for the embossing machine 20, and the lower part of the carriage 27 within which a part of the escapement mechanism is mounted, are best illustrated in FIGS. 1, 2, 6 and 8–12. As indicated in several of these figures, the lower carriage member 28 is supported upon the guide rail 23 by means of a pair of wheels 151 and 152 which engage a track portion 153 of the guide rail. In addition, a plurality of individual guide wheels 154 are mounted upon the lower carriage member in engagement with the vertical faces of the guide rail. These wheels or rollers 154 help to maintain the lower carriage member 28 in alignment with respect to the guide rail. It is the wheels or rollers 151, 152, and 154 which maintain the carriage in accurate alignment with respect to the rail 23 and the embossing station 21 of the machine as the carriage moves along the rail for character spacing.

As indicated hereinabove in connection with FIG. 2, a part of the character spacing escapement 36 is mounted on the rail 23 and another part of the escapement mechanism is mounted on the bracket or support portion 108 of the lower carriage member 28. Thus, as best illustrated in FIGS. 8 and 12, a shaft 161 is rotatably mounted on the lower carriage support bracket 108 and a pair of yokes 162 and 163 are affixed to the shaft in spaced relation to each other. The shaft 161 is provided with a knurled knob or handle 164 to afford a convenient means for rotating the shaft. In addition, a spring actuated detent device 165 (see FIG. 8) is associated with the shaft 161 and is utilized to maintain the shaft in any one of four different angular positions. Any suitable detent arrangement may be employed for this purpose; consequently, the detent device 165 need not be described in detail herein.

Four individual escapement racks 166, 167, 168 and 169 are mounted upon the yokes 162 and 163. Considering the rack 167, for example, it is seen that the rack is provided with a threaded end 171 which engages in a tapped opening in the yoke 163 and is also threaded into a nut 172. The opposite end 173 of the rack 167 engages in an open slot in the yoke 162. The end 173 of the rack 167 may be provided with a slot for receiving a screw-driver or with any other suitable arrangement providing for convenient turning of the rack. Accordingly, it is seen that the rack 167 may be readily removed from the escapement mechanism simply by removing the nut 172 and turning the rack until the threaded end 171 is released from the threads in the yoke opening. When this is accomplished, the rack 167 may be lifted from the escapement mechanism and may be readily and conveniently replaced by a different escapement rack. Moreover, the longitudinal position of the rack with respect to the yokes 162 and 163 may be adjusted by rotation of the rack and by changing the position of the nut 172 thereon, as indicated by the different longitudinal alignments of the three racks 166–168 in FIG. 8. As indicated in FIGS. 8 and 12, the remaining racks 166, 168 and 169 are mounted in the yokes 162 and 163 in the same manner as described hereinabove in connection with the rack 167.

The principal operating members of the escapement mechanism 36, other than the escapement racks, are mounted upon the rail 23 and are best illustrated in FIGS. 2, 8 and 11. As indicated in these figures, the escapement mechanism 36 includes a lever 175 which is mounted upon the guide rail 23 for vertical pivotal movement with respect thereto. Vertical movement of the lever 175 is controlled by the character space rod 41, which engages the lever as best indicated in FIGS. 8 and 11. The lever 175 supports an escapement pawl lever 176, the lever 176 being mounted for horizontal pivotal movement with respect to the lever 175 by means of a pivot pin 177. The pawl lever 176 terminates in a holding pawl 178 which normally engages one of the racks 166–169, in this instance the rack 167. A second pawl 179 is also included in the character spacing escapement mechanism. The pawl 179 forms a part of a second pawl lever 181 mounted upon the lever 175 in essentially the same manner as the lever 176. Preferably, the two pawl levers 176 and 181 are connected to each other so that pivotal movement of one pawl lever causes a corresponding pivotal movement of the other.

The pawl lever 176 is provided with an extension portion 182 which is positioned for engagement by a camming member 183 (see FIG. 4). The camming member 183 is of substantially hook-shaped configuration and comprises an extension of a carriage release lever 184 which is pivotally mounted on the side of the rail 23 opposite the carriage, the pivotal mounting for the lever 184 being indicated by the reference numeral 185. Thus, the hook-shaped camming member 183 projects through an enlarged aperture 186 in the guide rail 23.

An extension portion 187 of the lever 184 projects downwardly below the lower edge of the guide rail 23 (see FIG. 11). A limit stop member 188 is mounted upon the lever extension 187 in position to engage the bottom of the guide rail and limit pivotal movement of the lever 184. The lever 184 is biased, by means of a spring 189, to maintain the lever in the normal operating position illustrated in FIG. 11, with the stop member 188 in engagement with the guide rail. Another extension portion 191 of the lever 184 is engaged by the carriage release rod 40 to control the carriage release mechanism of the embossing machine, as described more fully hereinafter.

The end portion 193 of a back space actuating rod 192 projects through an opening 194 in the guide rail 23 and engages one arm 195 of a bell crank 196. The bell crank is pivotally mounted on the front of the guide rail, as indicated at reference numeral 197. A spring 198 is employed to bias the bell crank 196 into engagement with the rod extension 193, being connected to the other arm 199 of the crank.

A slide 201 is pivotally mounted on the end of the bell crank arm 199, as indicated at 202. The opposite end of the slide 201 is provided with a slot or aperture 203 which engages a pin 204 that is fixedly mounted on the guide rail 23. The slot 203 is substantially larger than the pin 204 and is provided with an upwardly extending cam surface 205 for a purpose described hereinafter. An elongated arm 206 is mounted on the slide 201 and extends over the particular escapement rack which happens to be in operative position at any given time, in this instance the rack 167. The arm 206 terminates in a back space pawl 207 which may be moved into engagement with the rack 167 to effect a back spacing movement of the embossing machine carriage, as described hereinafter. A spring or other suitable biasing device 208 urges the arm 206 downwardly; however, the arm 206 and the lever 201 are normally maintained in the position illustrated in FIG. 11 by the engagement of the lever 201 with the pin 204.

FIGS. 9 and 10 show, in detail, the adjustable stop device 50 which determines the location of the carriage at the beginning of each line of embossure. As indicated therein, the adjustable stop device comprises a bracket 211 which is affixed to one end of the rail 23. A shaft 212 is journaled in a suitable opening in the bracket 211 and a yoke 213 is affixed to one end of the shaft. Preferably, the shaft is provided with a knurled knob or other member such as the knob 214 to afford a convenient means for rotating the shaft. Moreover, a suitable spring-biased detent having four alternate positions is utilized to prevent undesired rotation of the shaft.

Four individual stop members 215, 216, 217 and 218 are included in the device 50. These stop members are threaded into suitable tapped openings in the yoke 213. Moreover, four individual retainer nuts 219 may be mounted on respective ones of the stop members to hold the stop members in predetermined positions with respect to the yoke. As indicated in FIG. 10, each of the stop members may project outwardly of the yoke 213 to a different extent, thereby affording four different initial line starting positions. Only one of the stop members, at any given time, is in position to engage a projecting portion 221 of the lower carriage member 28. Thus, by rotating the shaft 212, four distinct and different line starting positions may be afforded for the line embossing machine carriage.

The character space mechanism and associated apparatus, as drescribed hereinabove, is extremely versatile in operation and provides for maximum flexibility in the embossing machine 20. Considering the character spacing escapement and its normal mode of operation, it is seen that the spring 38 normally urges the carriage 27 to the right as viewed in FIGS. 1, 6 and 8. Movement of the carriage in this direction, however, is normally prevented by engagement of the holding pawl 178 with one of the teeth or lugs of the escapement rack 167.

Whenever one of the character keys, or the space bar, of the embossing machine keyboard is depressed, the character space rod 41 is driven downwardly by means of a linkage connecting the space bar and each character key to the rod 41. This linkage is conventional in nature and hence need not be described in detail. The downward movement of the rod 41 causes the lever 175 to pivot in a counterclockwise direction as viewed in FIG. 11. Consequently, the holding pawl 178 is disengaged from the rack 167 and the pawl 179 is brought into engagement with the rack. Because the two pawls are displaced horizontally by a relatively small distance with respect to each other, the disengagement of the pawl 178 and engagement of the pawl 179 permits the carriage to move a relatively small distance to the right as viewed in FIGS. 6 and 8. This movement is of course effected by the spring 38.

When the character key or space bar is released, the rod 41 returns to its normal position and the lever 175 is pivoted in a clockwise direction, back to its original position. This return movement of the lever 175 may be effected by any suitable means such as a spring 222. The return movement of the lever 175 releases the pawl 179 from engagement with the rack 167 and again brings the pawl 178 into position to engage the rack. Because the carriage has moved slightly to the right, however, the pawl 178 does not engage the same tooth or lug on the rack as it engaged in the first instance. Instead, the carriage moves a further distance to the right and brings the next subsequent escapement tooth into engagement with the pawl 178. This completes the character spacing movement. The above recited actions are repeated, of course, each time the space bar or one of the character keys of the embossing machine is actuated.

The rack 167 may provide a tooth spacing which corresponds to one or more sizes and styles of type which may be employed in the embossing machine. On the other hand, the character spacing afforded by this rack may be completely unsatisfactory for other and substantially different sizes and styles of type. When a different type style is to be employed, the escapement mechanism 36 may be adjusted to accommodate the new type style by rotating the shaft 161 to bring a different one of the escapement racks into operating position. Thus, by reference to FIG. 12, it is seen that a quarter turn of the shaft in a clockwise direction brings the rack 166 into the operating position previously occupied by the rack 167. Similarly, either of the two racks 168 and 169 may quickly and conveniently be substituted for the rack 167, merely by rotating the shaft 161 to a different one of its four detented positions.

The four individual racks 166-169 may accommodate an extremely large number of different sizes and styles of embossing type. However, even four such racks may not be sufficient to accommodate all of the multiplicity of different type styles presently available for the embossing machines such as the machine 20. Moreover, in some special applications, individualized spacing requirements may be presented. Such special situations are easily and conveniently met, however, merely by removing one of the racks 166-169 and replacing the rack with a separate rack which affords the desired spacing characteristics. As noted hereinabove, this is accomplished simply by unscrewing the rack to be replaced and lifting it from the yokes 162 and 163, after which the new rack may immediately be mounted in the yokes. Replacement of the racks may thus be accomplished in a matter of minutes, making it possible to quickly and conveniently convert the embossing machine 20 to any size and style of type or to meet any special character spacing requirement.

To move the carriage 27 to the right hand limit of its travel along the guide rail 23, a carriage release key included in the keyboard 39 is depressed, driving the carriage release rod 40 upwardly (see FIGS. 1 and 11). The upward movement of the rod 40 causes the lever 184 to pivot in a clockwise direction, as seen in FIG. 11, against the biasing force exerted by the spring 189. The clockwise movement of the lever 184 causes the camming member 183 to engage the member 182 and pull the latter inwardly toward the rail 23. This movement of the member 182 disengages the pawl 178 from the rack 167 and thus releases the carriage for movement to the right under the influence of the spring 38. When the carriage release key is released, the lever 184 is returned to its original position by the spring 189, over-travel in the return direction being prevented by engagement of the stop member 188 with the underside of the rail 23. A spring 223 is employed to return the pawl levers 176 and 181 to their original positions.

On occasion, a back spacing operation may be desirable. Under these circumstances, a back space key in the keyboard of the embossing machine is depressed, driving the back space actuating rod 192 upwardly and pivoting the bell crank 196 in a clockwise direction (see FIG. 11). The pivotal movement of the crank drives the slide 201 to the left. As the slide moves to the left, the arm 206 and the left hand portion of the slide are impelled downwardly by the spring 208. This downward movement is controlled by the contour of the cam surface 205 and its engagement with the pin 204. The movement of the arm 206 downwardly and to the left, as seen in FIG. 11, brings the pawl 207 into an engagement with one of the teeth or lugs on the rack 167 (see FIG. 8). Continuing movement of the arm 206 drives the rack, and hence the carriage 27, to the left through a distance sufficient to engage the holding pawl 178 with the next adjacent lug on the rack. In this manner, the back spacing operation is completed. When the back space key is released, the back space linkage comprising the crank 196, the slide 201, and the arm 206 is returned to its initial position by means of the spring 198.

The tabulator mechanism

The tabulator mechanism of the embossing machine 20 is best illustrated in FIGS. 12–14, although the tabulator cooperates with some of the mechanisms described hereinabove, particularly in connection with FIGS. 1, 2, 8 and 11. The tabulator device illustrated in FIGS. 12–14 makes it possible to set the embossing machine for tabulated embossing operations, regardless of the size of type being employed. Moreover, the tabulator is relatively simple in construction and utilizes the carriage release mechanism described in the immediately preceding portion hereof as a part of the tabulation device.

As shown in FIGS. 12–14, an elongated substantially U-shaped bracket 231 is affixed to the guide rail 23 and depends therefrom. A portion 232 of the bracket 231 extends forwardly of the guide rail beneath the carriage 27. The bracket 231, and particularly the portion 232 thereof, is provided with a pair of bosses 233 and 234. A shaft 235 is rotatably mounted in the boss 234 and is provided with a knob or handle 236. The end of the shaft opposite the knob 236 carries a fixed collar 237 and also is provided with a socket for receiving a threaded tabulator shaft 238. A spring 239 is mounted on the shaft 235 and engages the collar 237 and the boss 234 to bias the shaft axially toward the right as seen in FIGS. 13 and 14.

As noted hereinabove, one end of the threaded tabulator shaft 238 is fitted into a socket in the end of the shaft 235. The opposite end of the shaft 238 extends through an aperture in the boss 233 and is threaded into a nut 241. Thus, the shaft 238 is effectively mounted between the two bosses 233 and 234, but is rotatable with respect thereto.

A plurality of tabulator stop members 243, 244 and 245 are mounted on the shaft 238. The stop members 243–245 are threaded on to the shaft. Moreover, each of the stop members abuts a pair of lock nuts that are threaded on to the tabulator shaft. Thus, the three tabulator stops 243, 244 and 245 are disposed in abutting relation with three pairs of nuts 246, 247 and 248, respectively. In each instance, therefore, the tabulator stop may be locked at a longitudinal position on the shaft 238 which is determined by the position of its associated locking nuts.

At the end of the shaft 238 adjacent the boss 233, there is mounted a lug 251. The lug 251 is affixed to the tabulator shaft for rotation therewith and is engaged by an extension portion 253 of a tabulator actuating rod 252. The rod 252 extends upwardly through a portion of the boss 233. The rod 252 is normally biased downwardly toward the position shown in FIGS. 12 and 13 by means of a spring 254, but may be moved upwardly to pivot the lug 251 in a manner described hereinafter.

The rod 252 extends downwardly and laterally and is connected to the tabulator key 56 through a lever 255 affixed to a shaft 256. Thus, it will be seen that depression of the tab key 56 causes shaft 256 to rotate and at the same time drives the rod 252 upwardly. A lug 257 is affixed to one end of the shaft 256 in position to engage a lever 258 which is connected to the carriage release rod 40 of the embossing machine and which carries the carriage release key 259. With the mechanism in its normal or unactuated position some clearance is provided between the lug 257 and the lever 258, so that the carriage release key 259 is depressed only after the tabulator mechanism has been actuated, as described hereinafter.

In addition to the main operating portion of the tabulator, as described hereinabove, the embossing machine 20 includes a lug or bracket 261 which is mounted upon the lower surface of the carriage member 28, on the bottom of the support member 108, and which forms a part of the lower carriage member. Preferably, the lug 261 is located closely adjacent the left-hand edge of the carriage as seen in FIG. 13.

Operation of the tabulator mechanism is controlled by the tab key 56 during operation of the embossing machine 20. Thus, at the beginning of, or in the course of, embossure of a given line, it may be desirable to move the carriage 27 to the right to start embossure of the line or a portion of the line at a given point different from the normal margin. For this purpose, the tab key 56 is depressed, rotating the shaft 256 in the direction indicated by the arrow 262 in FIG. 14. This movement of the shaft causes the tabulator control rod 252 to move upwardly within the boss 233. As the rod moves upwardly, the extension portion 253 of the rod engages the lug 251 and pivots the lug in a counterclockwise direction as seen in FIG. 12. The rotational movement of the lug 251 causes a corresponding rotation of the tabulator shaft 238 and thus pivots each of the tab stops 243—245 from an initial or inactive position to an actuated position. This movement of the tab stops is best illustrated in FIG. 12, in which the normal or unactuated position of the stops 245 is shown in solid lines and the actuated position is indicated by the dash outline 245A.

As the shaft 256 rotates, it brings the lug 257 into engagement with the lever 258 for the carriage release key 259. Continued rotation of the shaft accordingly causes the carriage release mechanism to be actuated by depression of the carriage release key in the manner described hereinabove. When the carriage release mechanism frees the carriage for movement to the right, however, the carriage does not travel to the full extent normally made possible by actuation of the carriage release mechanism alone. Instead, the released carriage is interrupted in its movement by engagement of the lug or bracket 261 with one of the tab stops 243—245. Assuming that the carriage movement starts from the position illustrated in FIG. 13, the movement of the carriage is interrupted by engagement of the lug 261 with the tab stops 243. Subsequently, when the tab key 256 is released, the carriage release key 259 is first returned to its normal position, re-engaging the escapement mechanism with the carriage as described hereinabove and preventing further movement of the carriage. Moreover, the spring 254 is effective to return the tabulator control rod 252, and the tab key 56, to the initial or unactuated condition illustrated in FIGS. 12, 13 and 14, permitting continuation of normal embossing operations. The pivotal movement of the shaft 238 to its original position may be effected by any suitable biasing means such as the torsion spring 263 (see FIGS. 13 and 14).

For maximum versatility in the tabulator operation, it is highly desirable that a relatively small pitch be utilized for the threads on the shaft 238. In fact, the longitudinal spacing between threads should be made relatively small as compared with the smallest character spacing utilized for the embossing machine 20. In this manner, it is possible to adjust the individual tab stops to positions along the shaft 238 which correspond to any desired tabulation position. Moreover, the readily removable mounting of the tabulator shaft makes it possible to change the tabulator arrangement simply by pulling the knob 236 outwardly of the boss 234 to permit removal of the tabulator shaft. Another tabulator shaft, with the stops at different pre-arranged positions, may then be substituted for the shaft 238. Thus, the embossing machine 20 may be quickly and conveniently conditioned for a variety of different tabulator operations without requiring individual adjustment of the tab stops each time a change is required. Because the tabulator cooperates with and utilizes the carriage release mechanism, in its operation, the tabulator is relatively inexpensive and does not add materially to the cost of the embossing machine.

Latch mechanism

Figure 16:
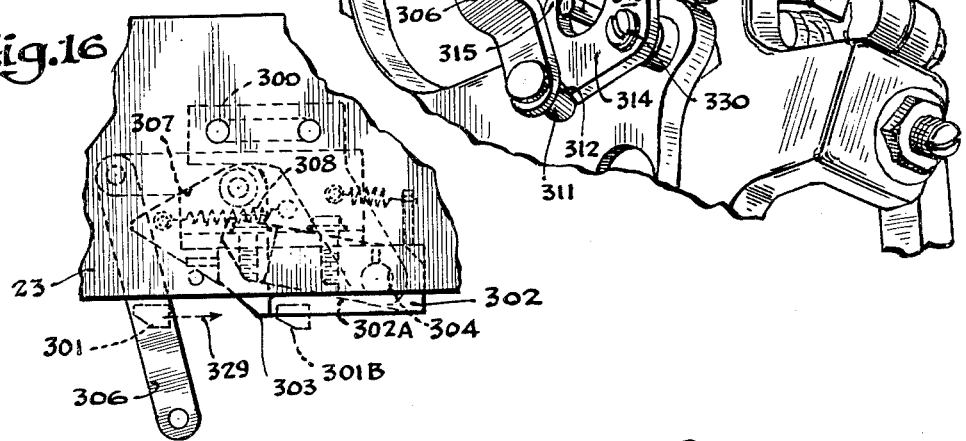
FIG. 16 is a detail fragmentary elevation view of a part of the latch mechanism mounted on the guide rail of the machine.
Figure 17:
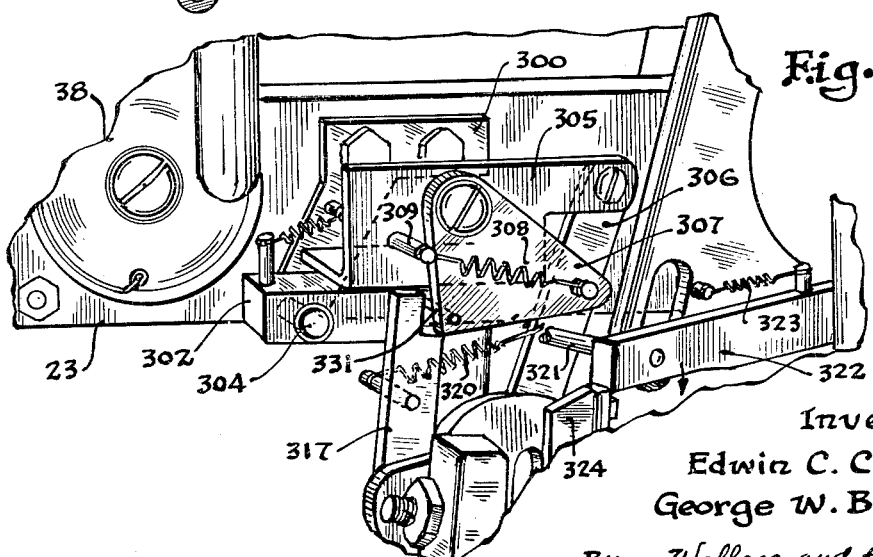
FIG. 17 is a fragmentary perspective view of the latch mechanism taken from behind the guide rail.
Figure 18:
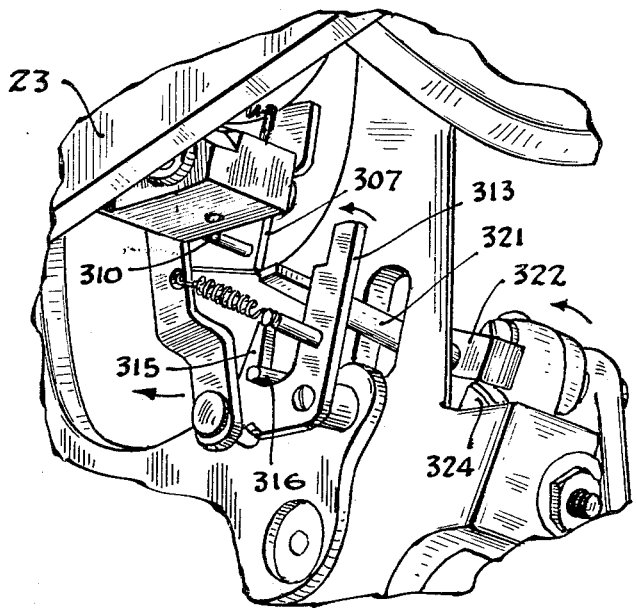
FIG. 18 is a perspective view similar to FIG. 15 but showing the latch mechanism in a different operating position.

As noted hereinabove, the embossing machine of the invention is employed with a latch mechanism for locking the carriage 27 at the right-hand end of the guide rail 23 in order that an embossed plate held in the work holder 30 may be rolled at the rolling station 52. This latch mechanism is best illustrated in FIGS. 15–19. In these figures, FIGS. 15–17 show the latch in its normal or unactuated condition, whereas FIG. 18 illustrates the latch in its actuated or latched position.

By reference to FIGS. 15–17, and particularly FIG. 15, it is seen that the carriage 27 is provided with a latch bar 301 which extends toward the lower edge of the guide rail 23. The latch bar 301 is thus positioned to engage a latch pawl 303 which projects from and comprises a part of a latch pawl lever 302. The lever 302 is pivotally mounted upon a mounting plate 300 by means of a pivot pin 304, FIG. 16. The mounting plate 300 is affixed to the guide rail 23, being mounted upon the side of the guide rail opposite the carriage 27 by bolts or other suitable means (see FIGS. 16 and 17).

The pawl lever 302 is part of a latch assembly which includes a bracket 305, FIG. 17, that is affixed to the lever 302 by suitable means such as one or more bolts or screws, and a dependent lever 306 which is pivotally mounted upon the bracket 305. In addition, a triangular cam plate 307 is pivotally mounted upon the bracket 305. This plate 307 comprises the moving member of an over-center toggle device included in the latch mechanism and is connected by a spring 308 to a pin 309 mounted upon the bracket 305. A pin 310 (see FIG. 15) is affixed to the cam plate 307 and projects toward the pawl lever 302 for a purpose set forth more fully hereinafter.

The end of the lever 306 opposite the pivotal mounting for this lever on the bracket 305 is provided with a pin or roller 311. The pin 311 engages in a slot 312 in one arm 314 of a crank-shaped lever 313. The crank 313 is pivotally mounted upon the frame of the machine as indicated by the mounting pin 330. The crank arm 314 is also provided with an extension 315 which engages a fixed pin 316 that is mounted on the frame of the embossing machine. The remaining arm 317 of the crank is provided with a notch or step 318 which, when the latch is in its normal or unactuated position, engages the flat end 319 of a rod 321. The arm 317 is also connected to the dependent lever 306 by means of a spring 320 (see FIG. 15).

Figure 19:
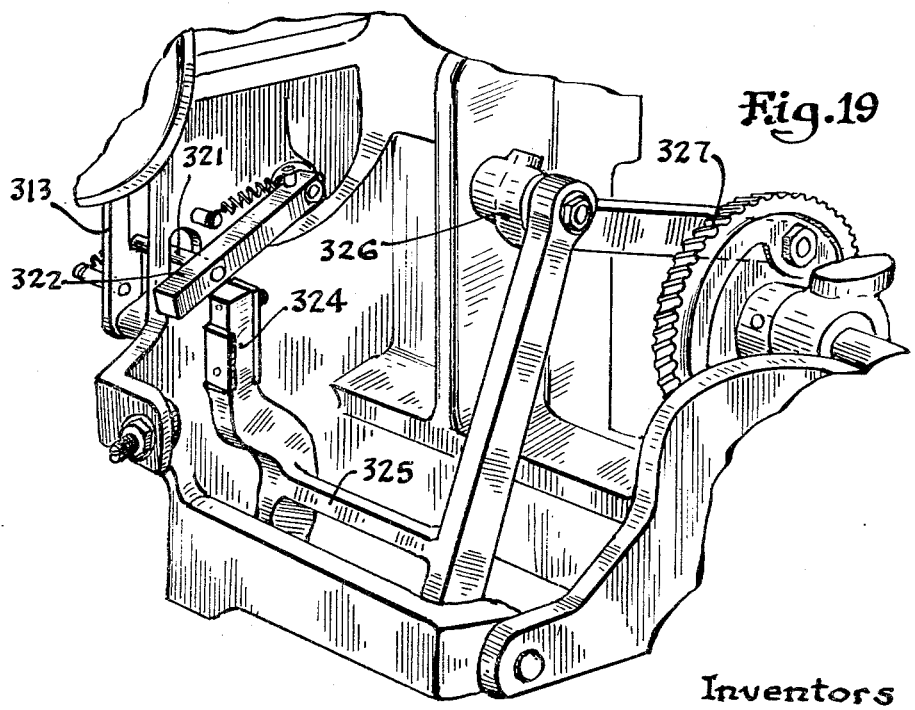
FIG. 19 is a detail view of a part of the latch actuating mechanism.

The rod 321 is affixed to an arm 322 that is pivoted on the frame of the embossing machine. The arm 322 is also provided with a biasing spring 323 which urges the arm toward movement in a counter clockwise direction as seen in FIG. 17. Thus, the arm 322 may be moved into engagement with an actuator 324. The actuator 324, as best indicated in FIG. 19, is mounted upon a rock shaft 325. The rock shaft 325, in turn, is actuated by the plate rolling mechanism of the embossing machine through a drive linkage including an eccentric 326 on the main drive gear 327 for the plate rolling station. The construction of the plate rolling station itself may be conventional in character, and therefore, need not be described herein.

To operate the latch mechanism of the embossing machine, the carriage 27 is moved to the right-hand end of the guide rail 23 as indicated by the direction arrow 329 in FIGS. 15 and 16. As the carriage moves to the right, the carriage latch bar 301 engages the latch pawl 303, causing the latch pawl lever 302 to pivot to the position 302A shown in phantom outline in FIG. 16. The pivotal movement of the lever 302 to the position 302A, of course, causes a corresponding movement of the entire assembly, including the bracket 305, the lever 306 and the cam plate 307.

The lever 306 is thus caused to pivot in a clockwise direction, as seen in FIG. 15, thereby pivoting the crank 313 in a clockwise direction and moving the step portion 318 of the crank away from the flattened end 319 of the rod 321. Consequently, the rod 321 is released for movement in response to the biasing force exerted upon the rod and upon its supporting lever 322 by the spring 323. Accordingly, the lever 322 drops and moves in a counter clockwise direction, as seen in FIG. 17, to a position where it may be engaged by the actuator 324. Of course, as the movement of the carriage continues in the direction of arrow 329 (FIGS. 15 and 16) the latch bar 301 reaches the position 301B (see FIG. 16) and the pawl lever 302 returns to its normal position with the pawl 303 engaging the latch bar 301 to prevent return movement of the carriage. This is the latched position for the mechanism and is the position maintained during the plate rolling operation.

At the end of the plate rolling operation, the actuator 324 engages the lever 322 and impels the lever in a clockwise direction on to the right as seen in FIG. 17. The movement of the actuator 324 is effected by the drive mechanism of the plate rolling station through the linkage comprising the eccentric 326 and the rock shaft 325 mentioned above. The resulting movement of the lever 322 causes corresponding movement of the rod 321, which engages the triangular cam plate 307 and tilts the cam plate in a clockwise direction as viewed in FIG. 18. The pin 310 on the cam plate engages the lever 306 and drives that lever in a clockwise direction, disengaging the pin 311 from the notch 312 in the crank arm 313. When the pin 311 is disengaged from the crank arm, the biasing spring 320 turns the crank in a counter clockwise direction, as seen in FIGS. 15 and 18, until movement of the crank is interrupted by the engagement of the projection 315 of the pin 316. During this period, the actuator 324 continues to move the lever 322, driving the rod 321 further to the left as seen in FIG. 18 (to the right as seen in FIG. 17) and moving the flattened portion 319 of the rod along the bottom of the cam plate 307 until the rod is free of the cam plate. When the rod end 319 is clear of the cam plate, the cam plate returns to its original position, as shown in FIG. 17.

The continuing cycle movement of the actuator 324 causes the actuator to move away from the lever 322, and the lever follows as it moves in a counter clockwise direction, or to the left as viewed in FIG. 17 in response to the biasing force afforded by the spring 323. Consequently, the rod 321 reverses the above-described movement and again engages the lower surface of the cam plate 307. In this instance, however, the rear surface 331 of the cam plate engages the pin 309, with the result that the return movement of the rod 321 lifts the entire assembly comprising the cam plate, the bracket 309, and the levers 302 and 306. This movement of the lever 302 again frees the pawl 303 from engagement with the carriage latch bar 301 and permits return of the carriage to the left along the guide rail 23 (FIGS. 15 and 16).

The continued lifting of the cam plate 307 by the end 319 of the rod 321 does not materially affect the mechanism until the rod again moves clear of the cam plate, at which time the entire assembly drops back to its original position as shown in FIGS. 15 and 16. The rod continues its movement to the right (FIG. 15) toward engagement with the step portion 318 of the crank arm 317. At the same time, the lever 306 swings back into engagement with the notch 312 in the other crank arm 314, the return movement of this lever being occasioned primarily by the inertia of the latch mechanism.

It is thus seen that the latch mechanism automatically and effectively latches the carriage 27 into position at the plate rolling station of the embossing machine upon movement of the carriage to the extreme right-hand end of its travel along the guide rail 23. Moreover, the latch mechanism automatically releases the carriage for return movement to permit a subsequent embossing operation as soon as the rolling operation is complete. The latching action is positive in nature, yet is released immediately upon completion of the plate rolling operation.

Hence, while the preferred embodiment of the invention has been illustrated and described, it is to be understood that this is capable of variation and modification, and we therefore do not wish to be limited to the precise details set forth, but desire to avail ourselves of such changes and alterations as fall within the purview of the following claims.

We claim:

1. In an embossing machine of the kind including an embossing station and a carriage mounted for movement in co-ordinate directions with respect to said embossing station, a workholder comprising: a shaft journalled in said carriage; a first jaw member affixed to said shaft for rotation therewith; a second jaw member journalled on said shaft; biasing means urging said second jaw member toward contact with said first jaw member to grip a blank printing device or the like between said jaw members; a spur gear affixed to said shaft; a drive gear disposed in meshing engagement with said spur gear; and an operating handle connected to said drive gear for rotating said drive gear to rotate said shaft and pivot said jaw members between a normal operating position in which said jaw members are effective to grip and support a blank printing device or the like in alignment with the embossing station of said embossing machine and a loading position in which said second jaw member is separated from said first jaw member to permit replacement of the printing device.

2. In an embossing machine of the kind including an embossing station and a carriage mounted for movement in co-ordinate directions with respect to said embossing station, a workholder comprising: a shaft journalled in said carriage; a first jaw member affixed to said shaft for rotation therewith; a second jaw member journalled on said shaft; resilient biasing means urging said second jaw member toward contact with said first jaw member to grip a blank printing device or the like between said jaw members; a spur gear affixed to said shaft; a drive gear disposed in meshing engagement with said spur gear; a stop member affixed to said carriage; and an operating handle connected to said drive gear for rotating said drive gear to rotate said shaft and pivot said jaw members between a normal operating position in which said jaw members are effective to grip and support a blank printing device or the like in alignment with the embossing station of said embossing machine and a loading position in which said second jaw member engages said stop member and is separated from the first jaw member to permit replacement of the printing device.

3. In an embossing machine of the kind including an embossing station and a carriage mounted for movement toward and away from and laterally with respect to said embossing station, a workholder comprising: a shaft journalled in said carriage; a first jaw member affixed to said shaft for rotation therewith; a second jaw member journalled on the workholder shaft; biasing means for urging said second jaw member toward contact with said first jaw member to grip a blank printing device or the like between said jaw members; a spur gear affixed to said shaft; a drive gear disposed in meshing engagement with said spur gear; a stop member affixed to said carriage in the path of rotational movement of said second jaw member but outside the path of movement of said first jaw member; an operating handle connected to said drive gear for rotating said drive gear to rotate said shaft and pivot said jaw members between a normal operating position in which said jaw members are effective to grip and support a blank printing device or the like in alignment with the embossing station and a loading position in which said second jaw member engages said stop member and is separated from the first jaw member to permit replacement of the printing device; and automatic latch means, engaged by said second jaw member and actuatable by movement thereof to said loading position to latch said carriage in predetermined withdrawn position with respect to said embossing station.

4. A tabulator for an embossing machine of the kind including a frame member, a workholder carriage member movable along a given path with respect to an embossing station in the machine, means biasing the carriage member toward movement in a given direction along that path, and an escapement mechanism for releasably retaining the carriage member at any of a plurality of predetermined spaced positions along the said path, said tabulator comprising: a stop member mounted on one of said frame and carriage members; an elongated threaded tabulator rack member mounted for pivoting action within the other of said frame and carriage members, the thread on said rack member having a pitch substantially smaller than the spacing between adjacent escapement positions; at least one tabulator stop threaded on said rack member; a pair of lock nuts threaded on said rack member and engaged with said tabulator stop to maintain the tabulator stop in predetermined angular and longitudinal orientation with respect to the rack member and out of alignment with said stop member; a carriage release device for releasing said escapement mechanism to permit movement of the carriage member in response to said biasing means; and an actuating mechanism, linked to the carriage release device and to said rack member, for conjointly actuating said carriage release device and for rotating said rack member to align said tabulator stop with said stop member.

5. A tabulator for an embossing machine of the kind including an elongated frame member, a workholder carriage member movable along a given path, parallel to said frame member, with respect to an embossing station in the machine, means biasing the carriage member toward movement in a given direction along that path, and an escapement mechanism for releasably retaining the carriage member at any of a plurality of predetermined spaced positions along the said path, said tabulator comprising: a stop member mounted on said carriage member; an elongated threaded tabulator rack mounted on said frame member, the thread on said rack having a pitch substantially smaller than the spacing between adjacent escapement positions; at least one tabulator stop threaded on said rack; at least one locking nut threaded onto said tabulator rack and engaging said tabulator stop to determine the angular and longitudinal orientation thereof on said rack; a carriage release device including a key operated lever for releasing said escapement mechanism to permit movement of said carriage member in response to said biasing means; and an actuating mechanism, linked to the carriage release device and to said rack, for actuating said carriage release device and for conjointly moving said rack to align said tabulator stop with said stop member, said actuating mechanism including means for engaging said key operated lever of said carriage release device.

6. A tabulator for an embossing machine of the kind including a frame member, a workholder carriage member movable along a given path with respect to an embossing station in the machine, means biasing the carriage member toward movement in a given direction along that path, and an escapement mechanism for releasably retaining the carriage member at any of a plurality of predetermined spaced positions along the said path, said tabulator comprising: an elongated threaded tabulator rack member, the thread on said rack member having a pitch substantially smaller than the spacing between adjacent escapement positions; at least one internally threaded tabulator stop supported on said rack member and movable therealong; at least one locking nut threaded onto said tabulator rack member and engaging said tabulator stop to determine the longitudinal and angular position thereof on said rack member; and means including a socket mount slidably movable toward and away from an end of said rack member for removably mounting said rack member on one of said frame and carriage members for ready replacement by a similar rack member to permit a complete change in tabulator positions without adjustment of said tabulator stop along said rack member.

7. A tabulator for an embossing machine of the kind including a frame member, a workholder carriage member movable along a given path with respect to an embossing station in the machine, means biasing the carriage member toward movement in a given direction along that path, and an escapement mechanism for releasably retaining the carriage member at any of a plurality of predetermined spaced positions along the said path, said tabulator comprising: a stop member mounted on one of said frame and carriage members; a longitudinally threaded tabulator rack member mounted on the other of said frame and carriage members; at least one tabulator stop supported on said rack and movable longitudinally thereof; means comprising a locking nut threaded onto said tabulator rack member and engaging said tabulator stop for maintaining said tabulator stop in fixed longitudinal and angular position on said rack member; a carriage release device including a key operated lever for releasing said escapement mechanism to permit movement of the carriage member in response to said biasing means; and an actuating mechanism mechanically connected to one of said rack and stop members, for moving said one member to align said tabulator stop with said stop member, said actuating mechanism including a lug means engageable with the key operated lever and normally spaced from said key operated lever to thereby afford a lost-motion connection therewith for actuating said carriage release device subsequent to alignment of said tabulator stop with said stop member.

8. A tabulator for an embossing machine of the kind including a frame member, a workholder carriage member movable along a given path with respect to an embossing station in the machine, means biasing the carriage member toward movement in a given direction along that path, and an escapement mechanism for releasably retaining the carriage member at any of a plurality of predetermined spaced positions along the said path, said tabulator comprising: a stop member mounted on said carriage member; a rack mount, supported on said frame member; a threaded tabulator rack removably journaled in said rack mount; a plurality of tabulator stops mounted on said rack and movable longitudinally thereof; means, comprising a corresponding plurality of locking nuts threaded onto said tabulator rack and individually engaging said tabulator stops, for maintaining said tabulator stops in fixed longitudinal and angular positions upon said rack; a carriage release device for releasing said escapement mechanism to permit movement of the carriage member in response to said biasing means; and an actuating mechanism, mechanically connected to said rack, for pivotally moving said rack to align said tabulator stops with said stop member, said actuating mechanism including a lost-motion linkage connected to said carriage release device to actuate said carriage release device after movement of said rack.

9. A carriage for positioning a workholder relative to an embossing station in an embossing machine, said carriage comprising: a first carriage member supported for movement along a first co-ordinate path with respect to said embossing station; biasing means for urging said first carriage member in a predetermined direction along said path; a plurality of character-space escapement racks; means for supporting said escapement racks upon said first carriage member with only one of said racks in operative position to be engaged by an escapement pawl, said means being readily adjustable to interchange racks at the operative position; a second carriage member supported on said first carriage member for movement along a second co-ordinate path substantially normal to said first path; biasing means for urging the second carriage member in a predetermined direction along said second path; a plurality of line-space escapement racks; means for supporting said line-space racks upon said second carriage member, said means being readily adjustable to locate any one of the racks at a predetermined operative position; and an escapement pawl mechanism, mounted on said first carriage member and including an escapement pawl disposed in engagement with the one of said line-space racks located at said operative position.

10. A carriage for positioning a workholder relative to an embossing station in an embossing machine, said carriage comprising: a first carriage member supported for movement along a first co-ordinate path with respect to said embossing station; biasing means for urging said first carriage member in a predetermined direction along said path; a plurality of character-space escapement racks; means comprising a rotatable turret for supporting said escapement racks upon said first carriage member with only one of said racks in operative position to be engaged by an escapement pawl, said turret being rotatably adjustable to a plurality of different angular positions, to interchange racks at the operative position said means including a spring-biased detent for maintaining said turret in a selected position; a second carriage member supported on said first carriage member for movement along a second co-ordinate path substantially normal to said first path; biasing means for urging the second carriage member in a predetermined direction along said second path; a plurality of line-space escapement racks; means comprising a rotatable turret for supporting said line-space racks upon said second carriage member, said turret being rotatably adjustable to a plurality of different angular positions to locate any one of the racks at a predetermined operative position, said means including a spring-biased detent for maintaining said turret in a selected position; and an escapement pawl mechanism, mounted on said first carriage member and including an escapement pawl disposed in engagement with the one of said line-space racks located at said operative position.

11. A carriage for positioning a workholder relative to an embossing station in an embossing machine having a frame member extending past said embossing station, said carriage comprising: a first carriage member supported for movement along a path parallel to said frame member; biasing means for urging said first carriage member in a predetermined direction along said path toward one end of said frame member; a plurality of character-space escapement racks; means comprising a rotatable turret for supporting said escapement racks upon said first carriage member with only one of said racks in operative position to be engaged by an escapement pawl, said turret being rotatably adjustable to interchange racks at the operative position; a corresponding plurality of limit stops of varying length; means, comprising a rotatable turret mounted at the other end of said frame member, for supporting said limit stops upon said frame member with only one limit stop in operative position to engage said carriage and limit its movement toward said other end of said frame member; means comprising a rotatable turret for supporting said line-space racks upon said second carriage member, said turret being rotatably adjustable to locate any one of the racks at a predetermined operative position; and an escapement pawl mechanism, mounted on said first carriage member and including an escapement pawl disposed in engagement with the one of said line-space racks located at said operative position.

12. In an embossing machine of the kind including a frame, an embossing station, a plate rolling mechanism located at a plate rolling station, a guide member comprising a part of said frame and extending between said embossing station and said plate holder station, and a carriage movable along said guide member between said stations, a latch mechanism for holding said carriage at said plate rolling station during a plate rolling operation comprising: a latch bar mounted on said carriage; a latch assembly mounted on said frame and including a latch pawl normally positioned in the path of movement of said latch bar, said assembly being movable from a latching position to a release position in response to engagement of said latch bar with said latch pawl as said carriage is moved from said embossing station toward said plate rolling station; bias means for urging said latch assembly toward said latching position to engage said latch bar and maintain said carriage at a predetermined position in relation to said plate rolling station; and latch release means, effectively linking said plate rolling mechanism and said latch assembly, for automatically moving said latch assembly to said release position upon completion of a plate rolling operation.

13. In an embossing machine of the kind including a frame, an embossing station, a plate rolling mechanism located at a plate rolling station, a guide member comprising a part of said frame and extending between said embossing station and said plate holder station, and a carriage movable along said guide member between said stations, a latch mechanism for holding said carriage at said plate rolling station during a plate rolling operation comprising: a latch bar mounted on said carriage; a latch assembly pivotally mounted on said guide member and including a latch pawl normally positioned in the path of movement of said latch bar, said assembly being pivotally movable from a latching position to a release position in response to engagement of said latch bar with the leading portion of said latch pawl as said carriage is moved from said embossing station toward said plate rolling station; bias means for urging said latch assembly toward said latching position to engage the trailing portion of said latch bar and maintain said carriage at a predetermined position in relation to said plate rolling station; and latch release means, for automatically moving said latch assembly to said release position upon completion of a plate rolling operation, said latch release means including an actuator mechanically linked to said plate rolling mechanism for movement from an inactive position to an active position in which said actuator engages said latch assembly; and trip means, including a trip lever pivotally mounted on said latch assembly, for engaging said actuator to maintain said actuator in said inactive position until said latch bar pivots said latch assembly to said release position.

14. In an embossing machine of the kind including a frame, an embossing station, a plate rolling mechanism located at a plate rolling station, a guide member comprising a part of said frame and extending between said embossing station and said plate holder station, and a carriage movable along said guide member between said stations, a latch mechanism for holding said carriage at said plate rolling station during a plate rolling operation comprising: a latch bar mounted on said carriage; a latch assembly mounted on said frame and including a latch pawl normally positioned in the path of movement of said latch bar, said assembly being movable from a latching position to a release position in response to engagement of said latch bar with said latch pawl as said carriage is moved from said embossing station toward said plate rolling station; bias means for urging said latch assembly toward said latching position to engage said latch bar and maintain said carriage at a predetermined position in relation to said plate rolling station; latch release means, effectively linking said plate rolling mechanism and said latch assembly, for automatically moving said latch assembly to said release position upon completion of a plate rolling operation; and means for preventing actuation of said latch release means until said latch assembly is moved to said release position by said latch bar, the latter means including a crank pivotally mounted on said frame and having one arm engaged by said latch assembly and a second arm engaging said latch release means.

References Cited in the file of this patent

UNITED STATES PATENTS

| | | |
|---|---|---|
| 940,395 | Labofish | Nov. 16, 1909 |
| 993,583 | Davis | May 30, 1911 |
| 2,450,725 | Gruver | Oct. 5, 1948 |
| 2,576,596 | Gollwitzer | Nov. 27, 1951 |
| 2,886,163 | Wells | May 12, 1959 |